United States Patent [19]

Vizenor

[11] E Re. 28,847

[45] Reissued June 8, 1976

[54] INSIDE HELMET SIGHT DISPLAY APPARATUS

[75] Inventor: Richard P. Vizenor, Maple Lake, Minn.

[73] Assignee: Honeywell Inc., Minneapolis, Minn.

[22] Filed: Sept. 15, 1975

[21] Appl. No.: 613,593

Related U.S. Patent Documents

Reissue of:

[64] Patent No.: 3,787,109
Issued: Jan. 22, 1974
Appl. No.: 266,995
Filed: June 28, 1972

[52] U.S. Cl. ..... 350/302; 350/174; 350/298; 350/301

[51] Int. Cl.[2] ..... G02B 5/08

[58] Field of Search ..... 350/3.5, 21, 145, 174, 350/201, 298, 301, 302

[56] References Cited

UNITED STATES PATENTS

| | | | |
|---|---|---|---|
| 2,352,644 | 7/1944 | Linderman | 356/21 |
| 3,059,519 | 10/1962 | Stanton | 350/145 |
| 3,205,303 | 9/1965 | Bradley | 350/298 |
| 3,230,819 | 1/1966 | Noxon | 350/145 |
| 3,633,988 | 1/1972 | Farrar | 350/3.5 |

FOREIGN PATENTS OR APPLICATIONS

| | | |
|---|---|---|
| 1,589,907 | 5/1970 | France |
| 1,250,461 | 10/1971 | United Kingdom |

*Primary Examiner*—John K. Corbin
*Assistant Examiner*—F. L. Evans
*Attorney, Agent, or Firm*—Charles J. Ungemach; Henry L. Hanson; Charles G. Mersereau

[57] ABSTRACT

Helmet mounted display apparatus in which a reflective inside surface of a partially transparent visor is used as the primary optical element. A paraboloidal inside visor surface coated with a metallic film may be used. A light source image or a virtual image is positioned at the focal point of the inside surface of the visor. The outside surface of the visor may be coated with an anti-reflective coating.

2 Claims, 3 Drawing Figures

INSIDE HELMET SIGHT DISPLAY APPARATUS

Matter enclosed in heavy brackets [ ] appears in the original patent but forms no part of this reissue specification; matter printed in italics indicates the additions made by reissue.

BACKGROUND OF THE INVENTION

The present invention is in the field of head or helmet mounted reticle and display systems. More specifically, it is a system which provides an image superimposed on the normal field of view of an observer to whose head is has been attached. It is particularly suited to reconnaisance or weapons-aiming applications.

Prior art visual indicating or display systems are typified by the system disclosed in U.S. Pat. No. 3,291,906 to J. J. Ward et al. In the figure of the Ward et al. patent, a multiple gun cathode ray tube is used as source together with a collimating lens system and planar beam splitter. The planar beam splitter is placed in the pilot's line of sight so that the image from the cathode ray tube may be superimposed on the normal scene observed by the pilot.

In prior art development of a system in which these optics may be head-mounted, the cathode ray tube and heavy collimating lenses have been placed in a cylinder and mounted on either the right or left side of the pilot's helmet. This lopsided weight placement is a considerable disadvantage from the pilot's standpoint.

Furthermore, the combiner traditionally used is a small planar eyepiece placed in close proximity to the pilot's eye. This eyepiece is a considerable distraction to some pilots. The close proximity of the eyepiece to the pilot's eye has also been shown to cause pilot anxiety.

Since the prior art uses a beam splitter in combination with collimating optics, the field of view is limited severely by the size of the collimating optics. By using the inside surface of a head-mounted visor as the primary optical element, the field of view of the helmet mounted display apparatus may be significantly increased.

Another disadvantage of prior art helmet mounted display apparatus was that two complete sets of collimating optics were required in order to provide a system utilizable with either eye. The present invention may be used with either eye merely by simple adjustment.

Applicant's invention overcomes these prior art disadvantages by providing a reflective surface on a semi-transparent visor as its primary optical element. The visor is symmetrical about the helmet's longitudinal axis; therefore, no lopsided weight need be attached to the pilot's helmet. Secondly, because the pilots are accustomed to use of a visor and the visor edges are out of the field of view, the anxiety common with the use of a small beam splitter located close to the pilot's eye is averted. Thirdly, since the primary element is a concave mirror, the field of view of the device may be larger. Finally, by placing an adjustable source in the vicinity of the focal point of the inside visor surface the helmet mounted display may be used with either or both eyes.

It is therefore one important object of the present invention to provide head or helmet mounted display apparatus providing superimposed images for either eye without adjustment of the combining surface.

A second important object of applicant's invention is to provide helmet mounted display apparatus whose presence in the pilot's line of sight will not create a distraction to the pilot.

SUMMARY OF THE INVENTION

These and other objects are attained by the use of a partially transparent, partially reflective head-mounted visor, one surface of said visor having a concave shape and a curvature capable of collimating light. The concave surface of the visor has a definable focal point. The visor is combined with light emitting means which are positioned so that the image projected by the light emitting means appears to come from the focal point of the visor surface.

BRIEF DESCRIPTION OF THE DRAWING

The nature of the invention and distinguishing features and advantages thereof will be more clearly understood from the following detailed description and accompanying drawings in which.

DESCRIPTION OF THE PREFERRED EMBODIMENTS

Figure 1:
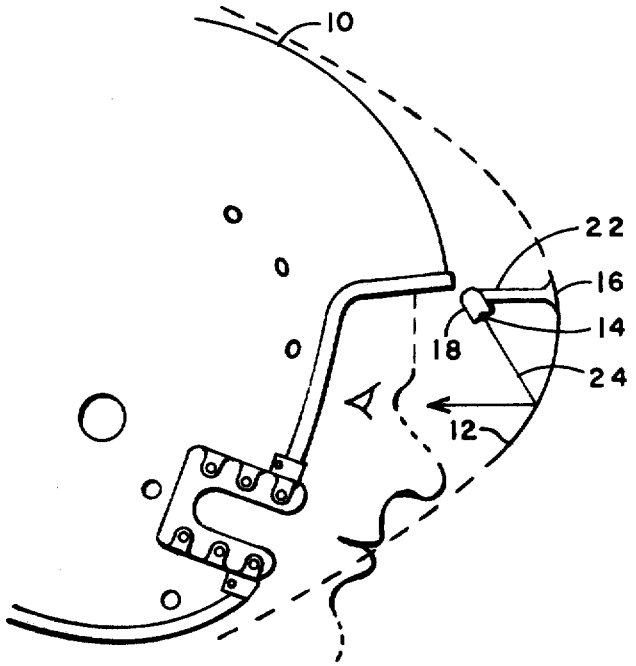
FIG. 1 is a conceptual drawing showing a side view of elements of a specific embodiment of the present invention in which the light source or light emitting means is centered at the focal point of a visor surface.

Referring now to FIG. 1, an observer's helmet 10, which may be a conventional aviation helmet of standard construction, is shown placed in close proximity to the inside surface 12 of a partially transparent, partially reflective visor. The term "visor," as used herein, refers to a face mask or frontal piece, typically used in conjunction with a helmet, through which an observer views the ouside world while the observer's eyes are protected from wind blast, foreign objects, and other hazards. The curvature of visor 12 is such that the surface has a definable focal point 14. The focal point of a reflective surface as used here may be defined as that point from which rays emanating outward and striking the surface are reflected back parallel to one another. Stated another way, the focal point may be defined by the point of convergence of a band of rays which strike the surface parallel to its axis. A paraboloid of revolution has been used in one embodiment of the invention, but a spherical or other concave surface with corrected light source could also be used.

Although the embodiments described here each use a helmet as a means for fixing the visor with respect to the observer's head, any mounting means which allows the visor to move in consonance with normal head movements of an observer so that the angular relationship between the head and visor is preserved, would be acceptable for use in applicant's invention.

Affixed to surface 12 in attachment area 16 is a light emitting means or light souce 18. Light source 18 is a light emitting object of small diameter which projects an information-containing image onto the visor surface 12. The light source 18 is positioned so that it projects from the visor focal point 14. The projected image might, for example, consist of a retical pattern used in combination with a weapon slaved in direction to the pilot's line of sight. Another possible image is the output of a low light level TV system or other visual aid which could be carried to the source 18 utilizing a fiber optics bundle. Regardless of its image information, light emitting source 18 shown is held rigid with respect to the visor surface 12 by a structural member 22 attached to the light source 18 and the attachment area 16 at opposite ends. An illustrative ray 24 is shown emanating from the light emitting source 18, striking the visor surface 12, and rebounding parallel to the axis of the visor surface.

The visor surface 12 will be coated with a reflective substance such as silver by vapor deposition. Although metallic films have been used in one embodiment of the invention, reflective coatings of any type are usable and metallic oxide coatings have been found satisfactory. A coating of appropriate density, known to those skilled in the art, will make the visor surface into a combining surface since it will be partially reflective and partially transparent. With the light source centered at the focal point, rays emitted from it will strike the reflective surface and a portion of them will be reflected substantially parallel to the axis of the visor surface.

Thus to an observer wearing the helmet 10, the image projected from the light emitting source 18 will appear superimposed on the scene he views through the visor and will appear to be located at infinity due to substantial parallelism of the reflected rays. For light sources of small area, that is, small displacement of the edges from the focal point of the surface 12, the eye will integrate out the slight non-parallel effect associated with not being located exactly at the focal point. Therefore a clear image of a reticle or a displayed object superimposed at infinity on the outside scene will be visible.

Figure 2:
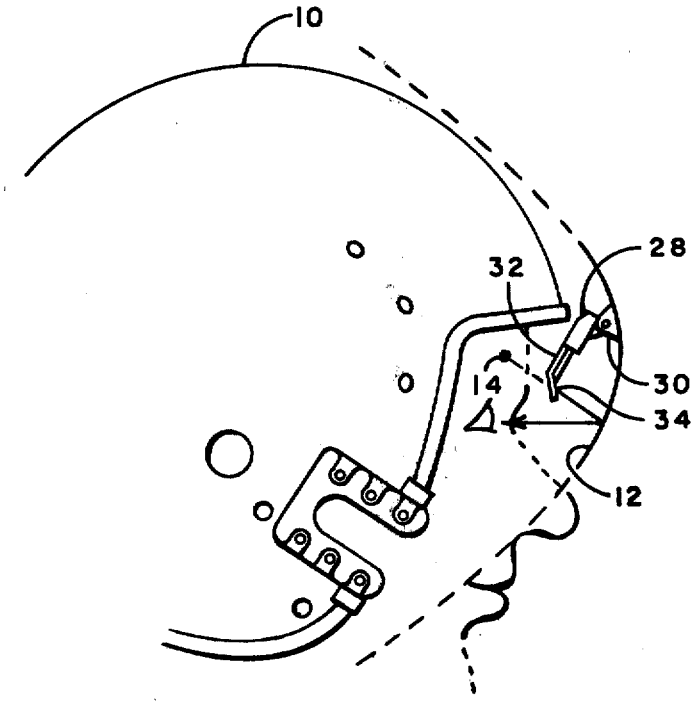
FIG. 2 is a conceptual drawing showing a side view of elements of an embodiment in which a mirror is used to place the virtual image of the light souce at a parabolic focal point so that the visor may be mounted more closely to the pilot's helmet.

FIG. 2 shows a slightly altered embodiment of applicant's invention. In FIG. 2, the observer's helmet 10 is located more closely to the visor surface 12. This is possible because of a change in the construction of the light emitting means.

A practical difficulty may occur in the use of the embodiment of FIG. 1 if it is desirable to make the visor stowable, that is, removable from a pilot's line of sight. The reason for this possible difficulty is that the visor surface does not closely conform to the approximately spherical surface of the observer's helmet 10. In the embodiment of FIG. 2, the focal point 14 is in actuality located in the space occupied by the observer's forehead. In this embodiment, the light emitting means 28 is hingedly attached to a clevis 30 which is connected to the visor surface 12.

The light emitting means 28 in FIG. 2 has an extension 32, one end of which is attached to the light emitting means 28. Th extension is in the direction of the longitudinal axis of the light emitting means 28. The opposite end of extension 32 holds a mirror 34. Mirror 34 is positioned such that the virtual image of an object displayed by the light emitting means 28 will be located at the focal point 14. The mirror 34, although planar in the preferred embodiment, need not necessarily be planar. It may have magnification power to increase the image size.

The technique of displacing the light emitting means from the focal point and utilizing a mirror to locate the virtual image at the focal point permits placement of the visor surface 12 much closer to the helmet than is the case with the embodiment figure shown in FIG. 1. Therefore, a track and visor shield making the visor retractable may be more easily incorporated into the helmet structure.

A visor suitable for use in this invention may be fabricated utilizing any highly transparent durable material. If constructed of a plastic substance, the visor may be either machined, cast or injection molded. As previously stated, in its preferred embodiment the visor will have its interior surface coated with a metallic oxide material making it a combiner. Additionally, use of a suitable anti-reflection or anti-glare coating on the outside convex surface of the visor has been shown to improve the performance of the applicant's invention.

The light emitting means 18 may project the image of either a reticle pattern or some other visual display. The most practical utilization of this system envisioned by the applicant is either a weapon sighting system or as an airborne reconnaissance system. In such applications, it may be used in conjunction with a helmet position sensing system of the type shown in U.S. Pat. No. 3,375,375 to R. Abbey et al. which determines the direction in which a pilot is looking, and may either train a weapon system, a camera or low light level television system in that direction.

In operation, in either of these two uses, the applicant's invention provides an image focused at infinity and superimposed upon the scene at which the pilot is looking. In the reticle application, the present invention essentially takes the place of the sight 28 shown in FIG. 1 of the Abbey et al. patent.

The display generated by the light emitting means of the present invention is centered at the focal point of the visor surface 12 since the characteristic of the visor surface 12 is to collimate light coming from the focal point. The light striking the visor surface and being reflected from it will be collimated and will thus appear superimposed at infinity on distant objects the observer views.

There is, of course, a limitation on the size of display which may be used with the visor surface. Because the display has a finite area, portions of it can certainly not be located at the focal point of the visor surface. If the display is made sufficiently small, as previously mentioned, the observer's eye integrates out the optical errors caused by the fact that the display is centered at the focal point, not located there.

Figure 3:
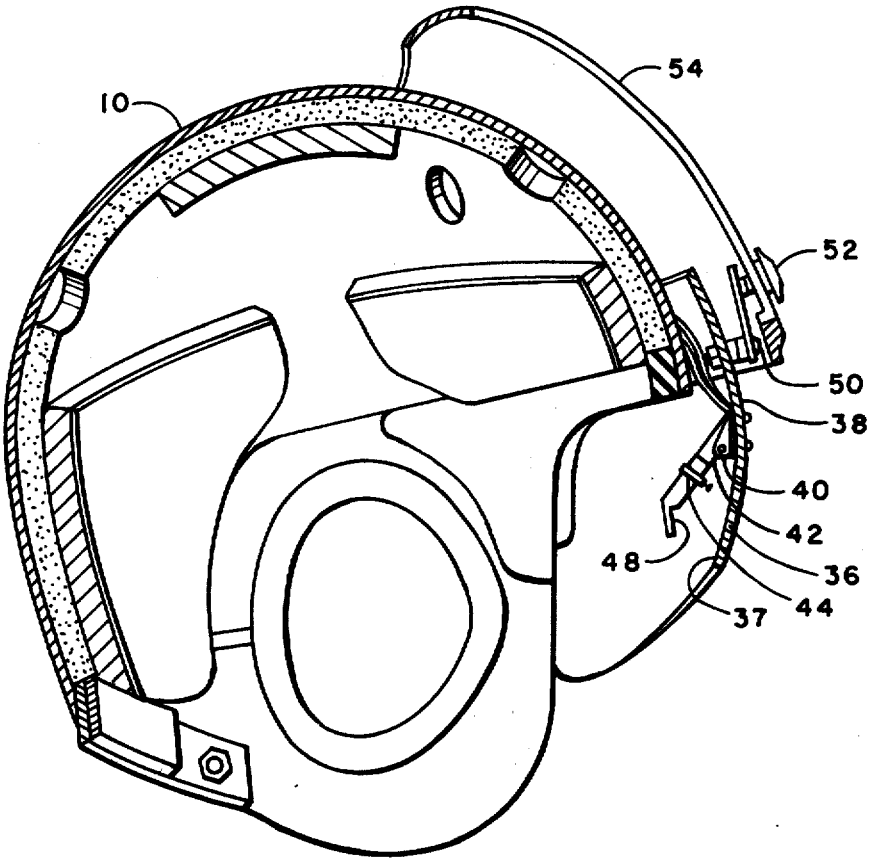
FIG. 3 is a cross-sectional view of a helmet with an embodiment of the helmet-mounted display apparatus utilizing the light source concept of FIG. 2.

In FIG. 3 there is shown a detailed cross-sectional view of a preferred embodiment of the applicant's invention. An observer's helmet 10 has a visor 36 with an inner concave surface 37 and an outer convex surface 38. The inner surface 37 may be coated with a metallic film to make it partially reflective. The preferred shape of the inner concave surface 37 is a paraboloid of revolution. The outer convex surface 38 is preferably coated with anti-reflective or non-glare type coating.

Rigidly attached to the visor surface is a clevis 40, to which a cylindrical light emitting means 42 is hingedly affixed. The light emitting means is hinged on the clevis so that it may fold toward the visor during visor retraction. The cylindrical light emitting means 42 has an adjustment collar 44 which may be used to adjust the orientation of a planar mirror 48 attached to the light emitting means 42. The planar mirror 48 is positioned so that light striking it from the light emitting means 42 will appear to be located at the focal point of the paraboloid of revolution which is the curvature of surface 36.

The visor is retractable by means of an offset member 50 which is connected through a mechanical coupling arrangement to the visor 37. Another portion of the offset member 50 is connected to a visor stowing knob 52. The edges of the visor (not shown) may be placed in a grooved track (not shown) of Delrin or other suitable material located between a protective overlay 54 and the pilot's helmet 10. A slot in the overlay 54 is provided so that the pilot stowing knob may be used to pull the helmet upwards, sliding it on the track. The light emitting means 42 is spring loaded so that when it contacts the edge of the helmet 10 it folds towards the surface 37 for stowage.

Thus it is apparent that there has been provided, in accordance with the invention, head mounted display apparatus that fully satisfies the objects, aims, and advantages set forth above. While the invention has been described in connection with specific embodiments thereof, it is evident that many alternatives, modifications, and variations, will be apparent to those skilled in the art in light of this description. Accordingly, it is intended to embrace all alternatives, modifications and variations falling within the spirit and broad scope of the appended claims.

I claim:

[ 1. A head-mounted display system comprising:

a. a partially transparent, partially reflective visor, one surface of said visor having a curvature for collimating light, the curvature having a definable focal point; and b. light emitting means positioned so that the light from said means appears to come from said focal point. ]

[ 2. The apparatus as defined by claim 1 and means for mounting said visor in a fixed geometrical relationship to an observer's head, so that said visor may move in consonance with the observer's head movements. ]

[ 3. The apparatus of claim 2 wherein said surface is defined by a paraboloid of revolution. ]

[ 4. The apparatus of claim 2 wherein the light emitting means includes a light source centered at said focal point. ]

[ 5. The apparatus of claim 2 wherein the light emitting means includes a light source and a mirror configured so that the virtual image of the source is centered at said focal point. ]

[ 6. Visual display apparatus, which comprises:

a. a visor having an inner concave parabolic surface which is partially reflective and partially transparent, said visor being of sufficient size to shield the eyes and forehead of an observer;

b. a helmet to which the visor is mounted in such a manner that an observer wearing the helmet may have his eyes shielded by said visor; and c. light emitting means, fastened to the concave visor surface, for projecting an image which is centered at the focal point of the concave visor surface. ]

[ 7. The apparatus of claim 5 wherein said light emitting means includes a light source and a substantially planar mirror placed at a predetermind angle to said light source. ]

[ 8. The apparatus of claim 2 wherein the visor has a substantially spherical curvature. ]

*9. A head-mounted display system comprising:*

*a. a partially transparent, partially reflective visor, one surface of said visor having a curvature for collimating light, the curvature having a definable focal point;*

*b. light emitting means position so that light travels from said means to a reflective surface which is located out of the observer's normal forward line of sight, the light being reflected from the reflective surface directly, and without being further reflected, to the one surface of the visor where the light is collimated and at least partially reflected to the observer generally along the observer's normal forward line of sight, the observer thus receiving the light as if it were originating at infinity.*

*10. The apparatus of claim 1 wherein said light emitting means is centered at said focal point.*

* * * * *